(12) United States Patent
Cros et al.

(10) Patent No.: US 10,780,650 B2
(45) Date of Patent: Sep. 22, 2020

(54) QUICK-MOUNT INTERCHANGEABLE SEALER AND PUNCH FOR PLASTIC FILM (71) Applicants: Laurent Cros, Gloucester, MA (US); Nicholas C. Green, Cayuga, NY (US)

(72) Inventors: Laurent Cros, Gloucester, MA (US); Nicholas C. Green, Cayuga, NY (US)

(73) Assignee: Pearl Technologies, Inc., Savannah, NY (US)

( * ) Notice: Subject to any disclaimer, the term of this patent is extended or adjusted under 35 U.S.C. 154(b) by 0 days.

(21) Appl. No.: 16/262,081

(22) Filed: Jan. 30, 2019

(65) Prior Publication Data
US 2020/0238630 A1 Jul. 30, 2020

(51) Int. Cl.
B29C 65/00 (2006.01)
B26F 1/44 (2006.01)
B29C 65/20 (2006.01)
B26D 7/26 (2006.01)
B32B 38/00 (2006.01)
B26D 7/18 (2006.01)
B29L 31/00 (2006.01)
B26D 7/00 (2006.01)

(52) U.S. Cl.
CPC ...... *B29C 66/02242* (2013.01); *B26D 7/2614* (2013.01); *B26F 1/44* (2013.01); *B29C 65/20* (2013.01); *B26D 7/1854* (2013.01); *B26D 2007/0018* (2013.01); *B29C 66/8511* (2013.01); *B29L 2031/7128* (2013.01)

(58) Field of Classification Search
CPC .......... B29C 66/02242; B29C 66/8511; B26D 7/2614; B26F 1/44; B32B 38/0004
See application file for complete search history.

(56) References Cited

U.S. PATENT DOCUMENTS

| 6,148,710 A | * | 11/2000 | Pottorff | B26D 3/12 83/682 |
| 7,080,585 B2 | * | 7/2006 | Prudhomme | B26D 7/025 83/143 |
| 2017/0144788 A1 | * | 5/2017 | Zurewich | B65B 59/04 |

* cited by examiner

*Primary Examiner* — Mark A Osele
*Assistant Examiner* — Christopher C Caillouet
(74) *Attorney, Agent, or Firm* — Bernhard P. Molldrem, Jr.

(57) ABSTRACT

A hole cutter/punch arrangement that can be changed over quickly to a different hole cutter or punch or slitter, or can instead be converted to a sealer in manufacture of items from plastic film. A reciprocating drive such as an air cylinder is coupled to a transverse mount or holder, of a T-shaped profile and the punches and sealers each have a mounting shoe with a transverse T-profile channel to slide onto the mount where a detent holds the shoe releasably in place. A triple-tree arrangement of a center drive post and left and right guide posts connects to the transverse holder.

15 Claims, 7 Drawing Sheets

QUICK-MOUNT INTERCHANGEABLE SEALER AND PUNCH FOR PLASTIC FILM

BACKGROUND OF THE INVENTION

The present invention relates to the manufacture of articles from plastic film, and is particularly directed to manufactures which require punches and the like for slitting and/or perforating film material such as polyethylene film or other films made of plastic resin, and sealer units which thermally soften the plastic film material to bond it to itself or to another sheet of polymer film. The invention is more particularly directed to a system that allows various punches and slitters to be rapidly changed out and replaced when needed to change the manufacturing process, and which are also capable for mounting any of various sealer units which can be then interchanged with one another or interchanged with a punch unit.

Interchangeable punch heads and mounts for them are described in prior U.S. Pat. No. 6,148,710 to Pottorff and U.S. Pat. No. 7,085,585 to Prudhomme. The descriptions of such elements as found in those two patents are incorporated by reference herein. The punch, which may be one or both of a hole punch and a slitter blade, can be formed on a base member as a unit that can be slid into a punch head adapter that has a T-slot channel to hold the base member of the punch with the punch head and/or the slitter blade pointed downward. A resilient member on the punch unit can fit into a detent on the holder when the base portion is in place in the T-slot channel. The resilient member engages the detent to hold the punch unit in place in the holder, and the resilient member can be disengaged when desired to remove the punch unit from the holder. The hole punch and/or slitter is oscillated up and down by a reciprocating apparatus, which may be actuated by a pneumatic cylinder. These hole punches may have a generally cylindrical, crown-shaped cutting head with a series of teeth formed around the lower circular edge, or more be in the shape of a triangle or rectangle, depending on the product that is to be formed from the plastic film.

A so-called quick-slip punch adapter for a plastic bag making machine is described in U.S. Pat. Nos. 5,035,165 and 5,114,394. Typically, there are several of these on each bag machine. U.S. Pat. No. 6,148,710 concerns a slitter and hole punch and quick-change adapter combination which fits a bag machine or similar equipment for punching holes and slits in a web of plastic film material. In that arrangement, a hole punch and a slitter blade are unitarily formed on a base member. Left and right resilient arms extend from distal to proximal, and have free ends that project proximally of the base member. The quick adapter can have a T-channel formed on a lower side to accommodate the replaceable hole punch and the slitter blade. The punches can be color-coded for barrel diameter, gap size, etc. A slitter punch may be used in combination with a hold-down plate arrangement that clamps the film in place momentarily while the punch mechanism is fired, and then releases the film immediately thereafter. In some designs, a spring is used to bias between the cutting head and the frame on which the hold-down plate is mounted. That is, punching arrangements may be provided with hold-down clamping arrangements to hold the plastic film workpiece against a backer plate while the punch descends to the film workpiece, and then release the film workpiece as the punch ascends.

In many manufacturing operations where a product is to be fabricated from a web of plastic resin film, sealers or sealer heads are used to contact the plastic film workpiece, and to heat the film to soften it so it can fuse or seal to an adjacent layer of film. It would be advantageous for the sealers to be interchangeable with the punch units, so that an existing mount can be used to hold the sealer head when needed or hold a punch head when that is what is needed.

OBJECTS AND SUMMARY OF THE INVENTION

Accordingly, it is an object of this invention to provide a hole cutter/punch arrangement that can be changed over quickly to a different hole cutter or punch or slitter, or can instead be converted to a sealer, each well suited for use in manufacture of items from plastic film.

It is an important object to provide a punch unit and a sealer unit that can be interchangeably mounted on a holder that moves the punch unit or sealer unit to ascend from and descend against a plastic film workpiece to punch the film or seal the film, respectively.

It is another object of the invention to provide a hole punch assembly which can be easily changed over to create holes of various diameters.

It is a further object to provide a punch and hold-down clamp arrangement that is interchangeable with a thermal sealer head, so that the same mount can be used for one or the other or both of the punch and sealer head, and such that the technician can quickly and safely change over from one to the other when needed.

According to one aspect of the present invention, a punch/sealer arrangement is configured for interchangeably punching an opening or slit into a sheet of a plastic film and sealing a predetermined portion of a sheet of plastic film, i.e., using quickly-mounted interchangeable punch heads and sealer heads. In this arrangement a mount, on which a punching head and a sealing head can be interchangeably mounted, is disposed along a film processing line and includes a frame, with an actuator which can favorably be an air cylinder or a linear actuator. The actuator has a rod or equivalent member that provides linear motion. The frame has a base plate situated opposite the actuator; and a transverse holder member positioned on the rod (or in a fashion to be moved by the rod). This holder member is favorably configured as transverse member having a T-shaped profile. At least one plastic-film punch is provided, configured to have a mounting shoe at upper portion thereof with the shoe being is configured with a T-shaped channel such that the mounting shoe slides into and is removably retained on the T-profile holder member. A spring loaded pin or other deflectable member removably engages a detent in the holder member to keep the punch head firmly secured after installation. Also at least one sealer arrangement may be provided which is interchangeable with the plastic-film punch. The sealer arrangement has a controllably heated plate that is adapted for softening the plastic film when brought into contact with the film, and a mounting shoe at upper portion thereof. The mounting shoe configured is with a T-shaped channel like that of the afore-mentioned plastic-film punch, such that the mounting shoe slides into and is removably retained on the T-profile holder member. This mounting shoe includes including a deflectable member, e.g., spring loaded pin, that removably engages a detent in the holder member, in a fashion similar to that of the plastic-film punch. In one disclosed arrangement, the transverse holder member includes a transverse bar and the pair of edge flanges on its distal side (i.e., lower side in the illustrated examples), remote from cylinder or actuator. The deflectable retaining member can include a spring-loaded pin passing into the T-channel of the mounting shoe, with a nose end of the pin being biased to engage the detent in the T-profile holder member.

In various embodiments of this invention, the mount employs a triple-tree support that includes a transverse support member that is attached onto the frame and has a series of guide openings, including a center opening and left and right guide openings. The rod of the actuator passes slidably through the center opening, and a pair of guide posts pass slidably through the left and right guide openings, respectively. The rod has a distal or end portion affixed onto the transverse holder member and the guide rods have respective distal portions affixed onto transverse holder member also, on opposite sides of the rod.

Favorably, the plastic film punch also incorporates a triple-tree punch guide arrangement. This also has a central vertical post and left and right guide posts which each are affixed onto a lower portion of the transverse holder member. The punch member is affixed onto a lower end of the central vertical post, and a hold-down cover may be disposed around the lateral sides and ends, favorably with a top wall disposed between the punch member and the transverse holder member. There are guide openings formed in the top wall and aligned with the left and right vertical guide posts and said central post, respectively. In these arrangements, a compression spring may be disposed over the central post, mounted between the top wall of the hold-down cover and the transverse holder member.

In favorable embodiments of the invention, the sealer arrangement or arrangements can include a triple-tree support that includes a transverse support member affixed onto the frame and has a series of guide opening, including a center opening and left and right guide openings.

The sealer may include a pair of winder spindles respectively positioned on opposite ends of the heated plate. A supply of a non-stick, heat-hardy flexible sheet, e.g., a film of PTFE (e.g., Teflon) extends between the spindles and across the heated plate. This serves to prevent the sealer from adhering to the plastic film workpiece, with the spindles being turned periodically to advance the PTFE film.

In either case, the punch head or sealer head can be switched out by pulling out the retaining pin, and sliding the T-slot mounting shoe from the T-profile transverse holder member. Any compressed air hoses or electrical wiring cables can be quickly unplugged from modular connections on the mount. The interchanged punch or sealer head can be quickly installed by sliding onto the transverse holder member, and then connecting any wiring cables or compressed air hoses.

Preferred arrangements may have interchangeable apertured backing plates on which the workpiece web of film is supported for cutting or sealing.

In the preferred embodiments described herein, the holder member on the mount is in the form of a male transverse member with a T-profile, and the mounting shoes that are at the upper end of the punch and at the upper end of the sealer unit are female channel members, where the mounting shoe slides over the male holder member. Nevertheless, other embodiments could have the roles of these elements reversed, with the holder member being a female channel member with a T-slot or T-profile transverse channel, and with the mounting shoes being in the form of a male transverse T-profile member such that the male and female members slide onto or into one another. That is in various embodiments, the transverse holder member can take the form of one of a male holder member having a T-shaped profile and a female channel member having a transverse T-profile channel, with the mounting shoes taking the form of the other of the male holder member and female channel member.

The above and many other objects, features, and advantages of this invention will become apparent from the ensuing description of an exemplary embodiment, which should be read in conjunction with the accompanying Drawing.

DETAILED DESCRIPTION OF THE PREFERRED EMBODIMENT

Figure 1:
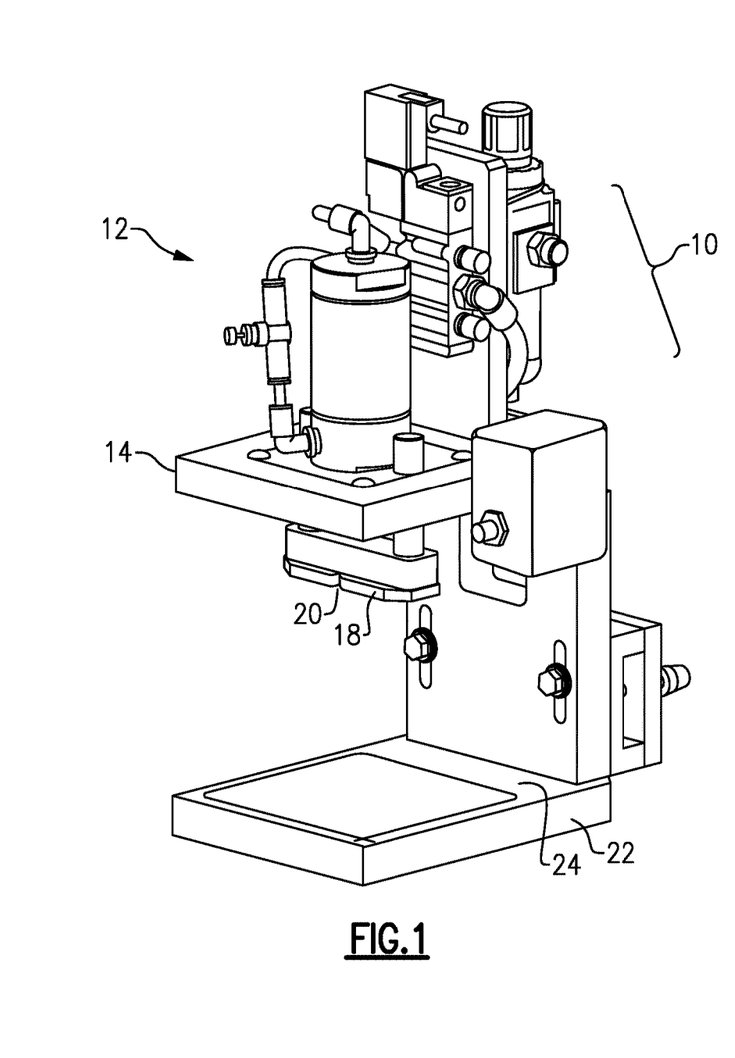
FIG. 1 is a perspective view of an operating mounting frame for a hole punch that is interchangeable with a sealer unit, according to an embodiment of the present invention.
Figure 2:
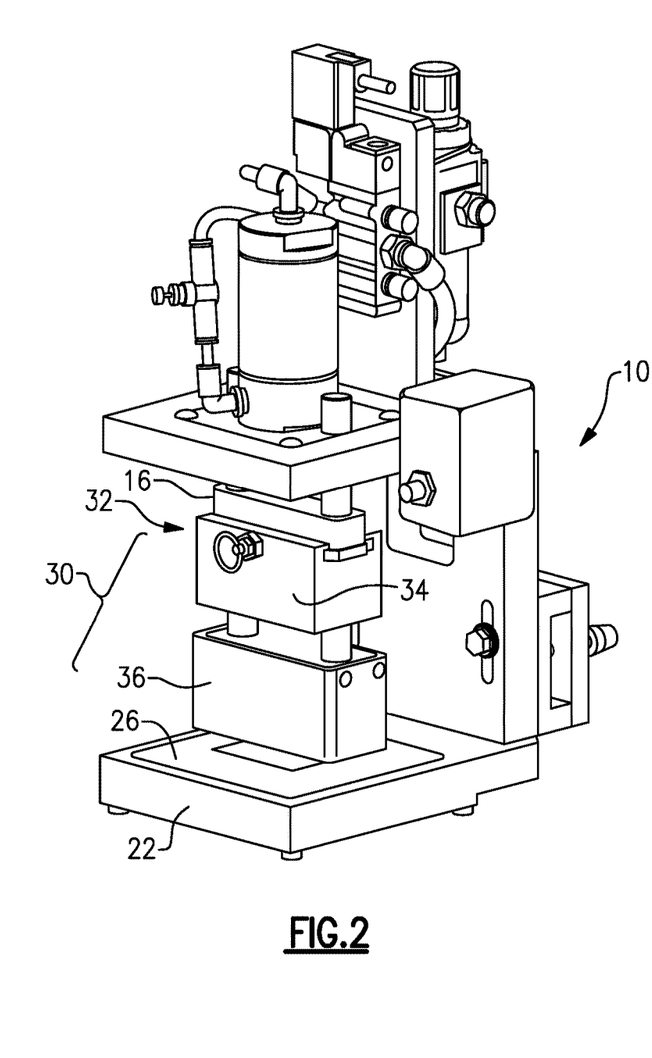
FIG. 2 is a perspective view thereof, on which a reciprocating hole punch for film is positioned.
Figure 3:
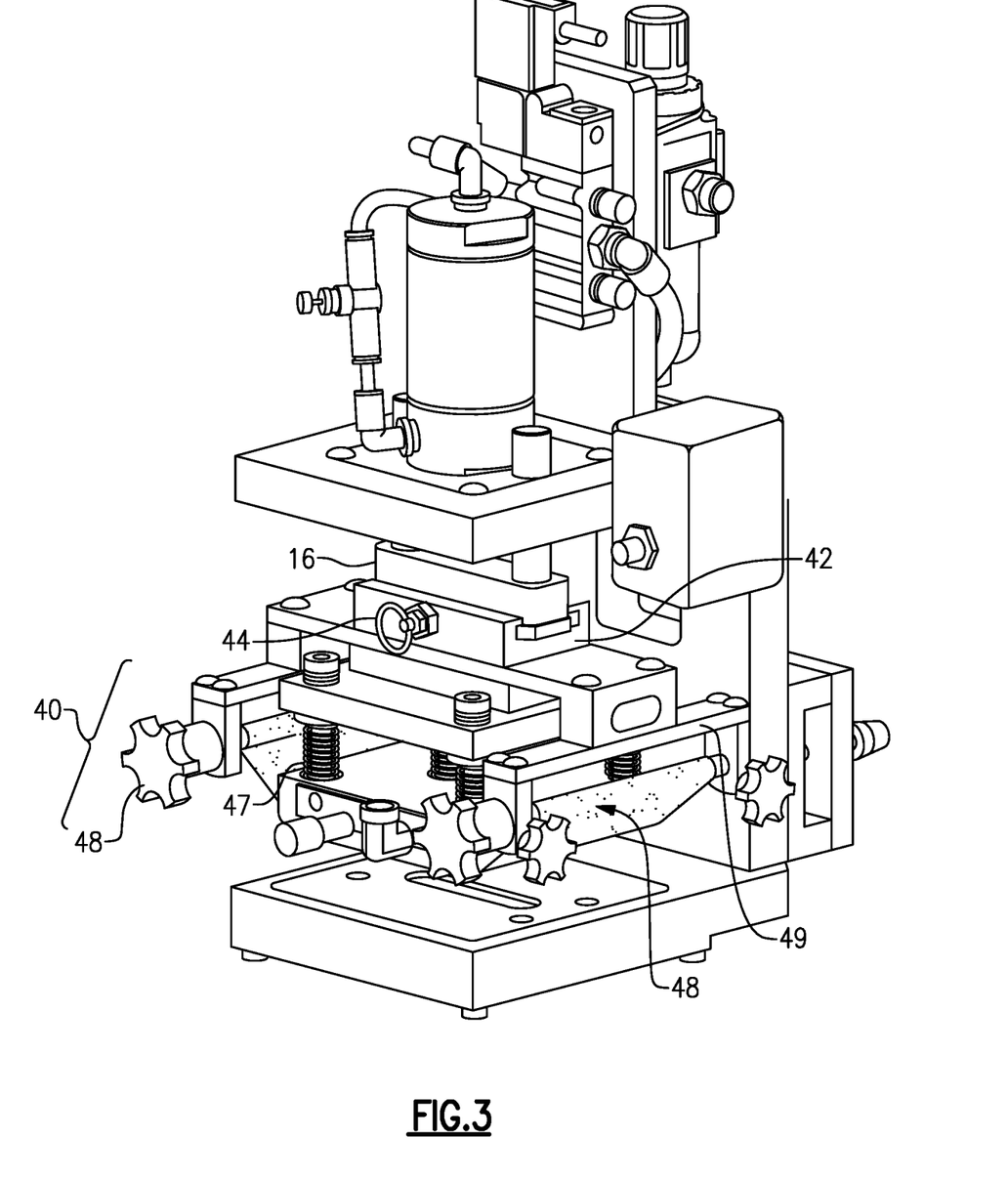
FIG. 3 is a perspective view thereof, on which a sealer unit for use on plastic film is positioned.

With reference to the Drawing, and initially to FIG. 1, a mounting frame 10 is configured for a punch head assembly 30 to be mounted, as shown in FIG. 2 or a sealer head assembly 40 can be supported, as shown in FIG. 3. The frame 10 has a double action air cylinder 12 supported on a platform or shelf 14 and where there is a T-bar mount or support 16 affixed onto the end of a rod of the cylinder 12 and guided by a triple-tree arrangement as will be discussed shortly. In the frame 10 a vertical back plate rises from a base plate 22 and has the horizontal shelf or platform 14 mounted upon it for holding the actuation components. An electrical box may be fitted onto a box mount on one side of the platform 14, and a pneumatic controls support plate may be mounted onto the other side of the platform. The support plate can also support a pneumatic regulator and an air valve. The actuator or cylinder 12 here is a double acting pneumatic cylinder and is supported centrally on the platform 14, with its rod extending downward. Electrical wiring and air hoses are omitted in these views, but would be present in a practical implementation of this embodiment.

The T-bar mount 16 extends laterally beneath the platform 14, and has a generally T-shaped profile, with a T-flange 18 at a lower or distal portion of the mount. An indent or recess 20 is present at a midway portion of the T-flange 18 and accepts a locking pin (to be described shortly) to hold a punch head or sealer head attachment from sliding off the T-bar mount 16. There is a base member 22 at distal or lower end of the frame 10 with a square or rectangular recess 24 which can accept a backing plate 26 (as shown in FIGS. 2 and 3) here shown with a punch opening 28 that is configured to match the geometry of a punch or slitter. Shown in FIG. 2 a punch assembly 30 has a transverse mounting shoe 32 that has a channel that is T-shaped in profile to slide over the T-bar mount 18, with a locking pin 34, favorably spring loaded, that has a tip that engages the recess indent 22 and locks the mounting shoe in place on the transverse T-bar mount 16. Beneath the mounting shoe 32 is a punch head assembly, of which only hold-down clamp or cover 36 is visible in FIG. 2. The clamp or cover 36 surrounds the hole punch and has an opening or openings at the base that correspond to the opening(s) in the backing plate 26 that the punch penetrates, so that with the cover 36 is down against the backing plate 26 the film workpiece is held steady when the punch penetrates it. A triple-tree arrangement, formed from the rod of the cylinder 12 and left and right vertical guide posts, hold the punch head assembly 36 in a fixed orientation so that it has only a vertical freedom of motion with no lateral or twist motion.

FIG. 3 shows a sealer assembly in which a sealer head unit 40 is interchangeably fitted onto the frame 10. A mounting shoe 42 with a transverse T-slot is fitted onto the T-profile T-bar mount 16 to permit the actuator or cylinder 12 to drive the sealer unit 40 vertically to form a thermal seal on a plastic film workpiece, which may favorably be two or more film layers. As shown, a locking pin 44 is positioned to engage the recess or detente 20 on the mount 16. This is favorably spring loaded so that the tip or nose of the pin 44 is biased forward, i.e., into the recess 20. The pin has a ring at the proximal end to allow a technician to pull the pin out and disengage from the mount 16 so the shoe 42 can slide laterally for removal from the mount 16.

A backing plate 50 is placed within the base plate opening 24 to support the film workpiece while a sealing operation is taking place. In the sealer head unit 40, a generally planar heated sealing plate 46 is positioned at the distal or lower side of the unit. An elongated sheet of a non-stick, thermally robust material, such as a ribbon or belt of PTFE film or tape, stretches across the lower face of the heated sealing plate, between first and second winder spindles 48. The spindles 48 have knobs on forward ends so that the spindles can be rotated to advance the PTFE tape and avoid having the sealer unit sticking to the plastic film workpiece.

Figure 4:
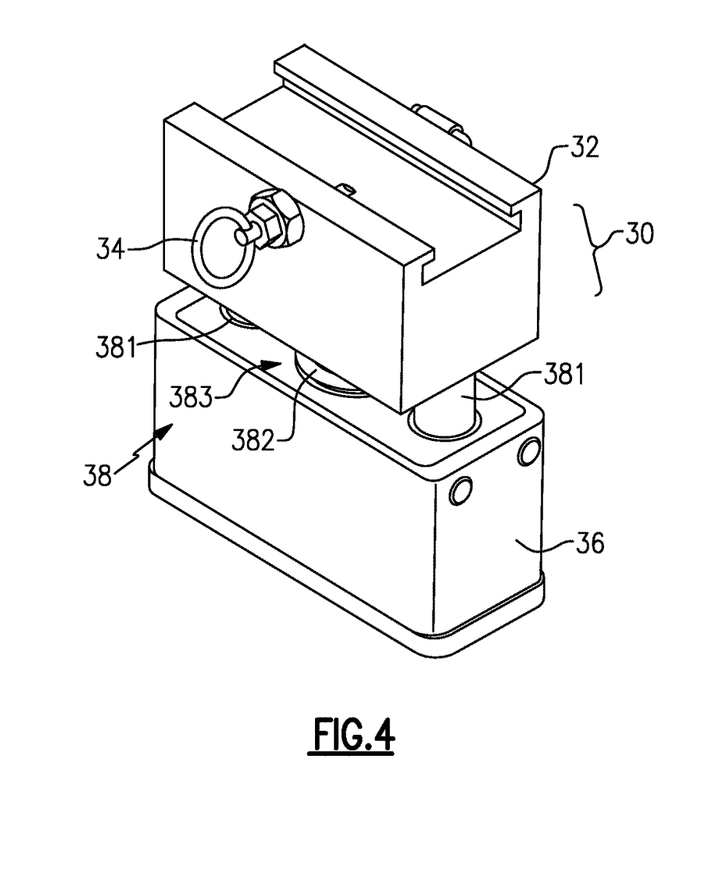
FIG. 4 is a perspective view of a hole punch assembly, featuring a film hold-down clamp surrounding a punch within it, and a holder member and slide-on shoe with T-slot adapted to fit onto the holder member of the operating mounting frame illustrated in FIG. 1, according to an embodiment of this invention.
Figure 5:
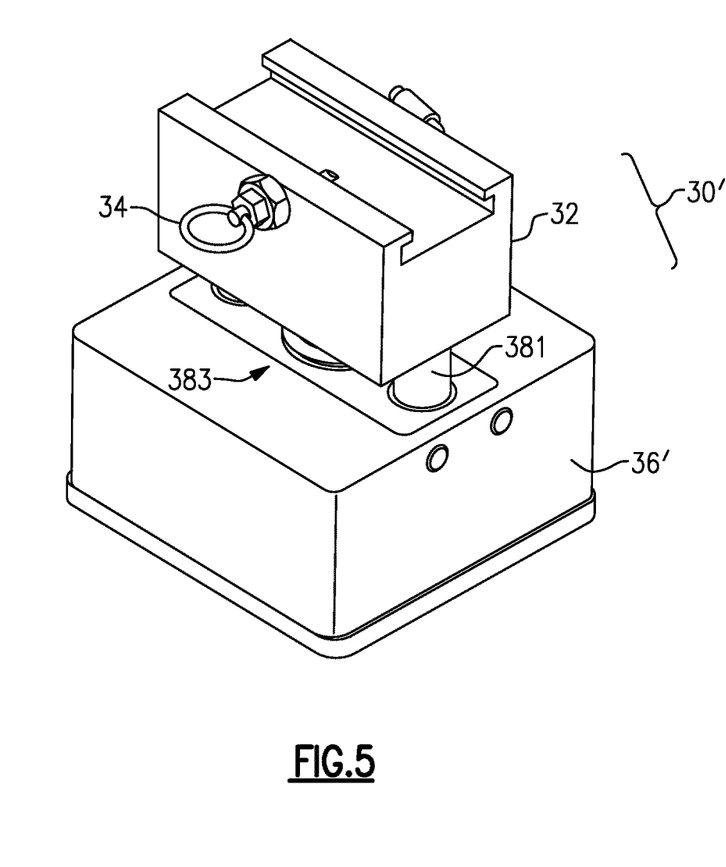
FIG. 5 shows an alternative hole punch assembly interchangeable with that of FIG. 4.

A pair of interchangeable punch head assemblies 30 and 30' are shown in FIGS. 4 and 5, respectively. The punch 30 has its shoe or mounting bracket 32 situated at the top, and the hold-down clap or cover 36 beneath. Here, the spring-loaded retaining pin 34 has its pull ring at the center top of the front. A compressed air fitting (not numbered) is situated on the opposite side of the shoe 32, and that will be discussed later. A triple-tree arrangement 38 is formed of a pair of left and right outer guide posts 381, 381, a center post 382, and a coil spring 343, which is coiled over the center post 382. These extend down from the mounting shoe 32 into openings in the top of the clamp or cover 36 to move the punch head which is concealed in these views within the respective clamp or cover. The punch head assembly 30' of FIG. 5 is similar, but is designed for a larger punch head for creating a larger or different-geometry hole in the plastic film workpiece. In these embodiments, the punch head can be fitted onto a lower or distal end of the center shaft 382. In favorable embodiments the center shaft can be hollow and connected at its upper end with the not-numbered compressed air fitting, to inject air into the punch head to assist in blowing out waste cutouts that result in the film workpiece. A waste tube (not-shown) can be positioned beneath the backing plate to collect the punched-out waste that is removed from the web workpiece of film so that the collected waste can be recycled or disposed of.

In some versions, the clamp or cover 36 for the hole punch assembly may be spring actuated to rise and descend with the action of the cutting head or hole punch.

Figure 6:
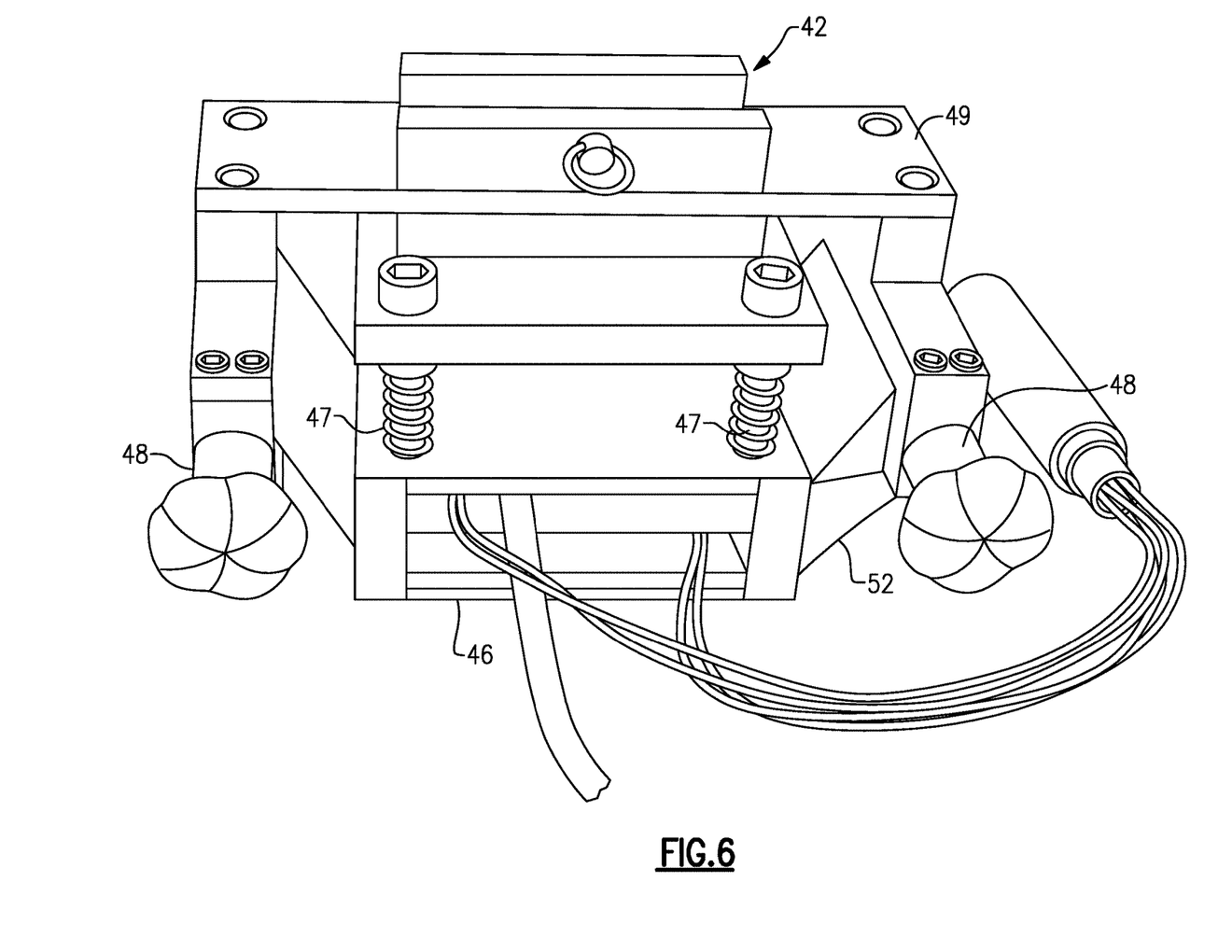
FIG. 6 is a perspective view of a sealer unit, adapted for quick-mounting onto the operating mounting frame of FIG. 1, according to an embodiment of this invention.
Figure 6A:
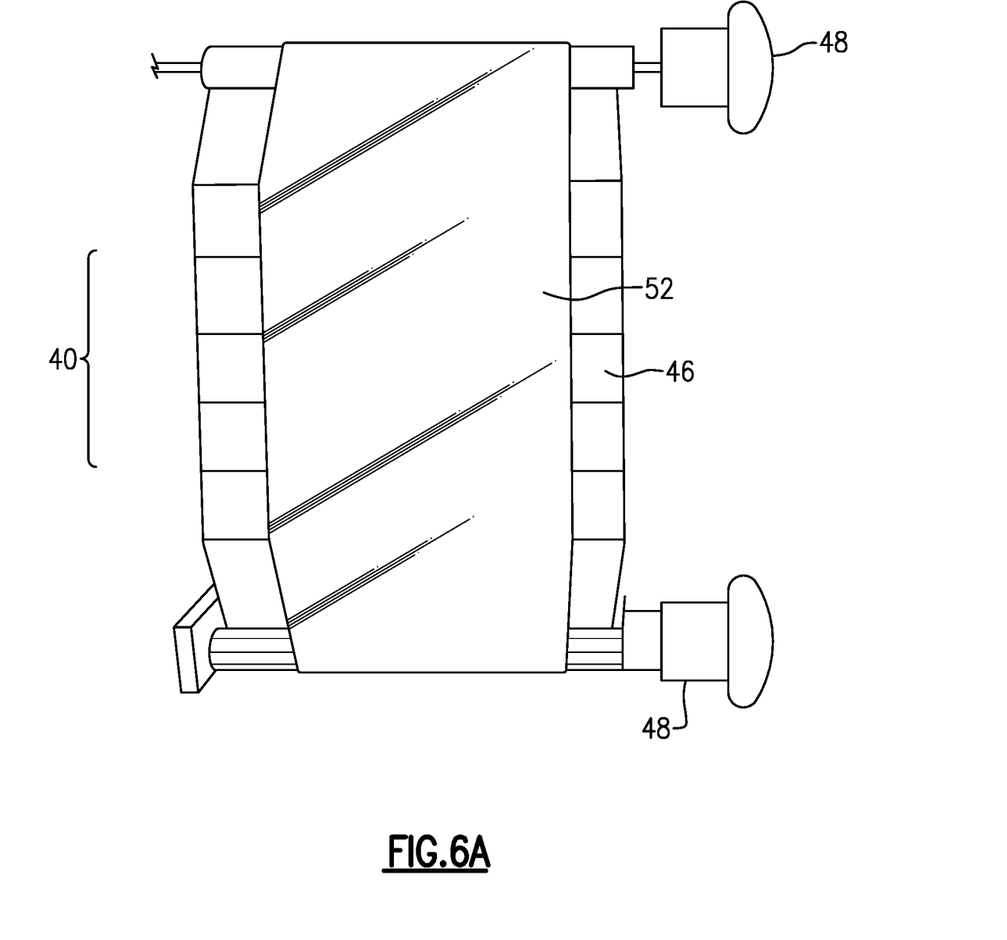
FIG. 6A is a bottom view showing a sheet of a non-stick material traversing the heated plate thereof.
Figure 7:
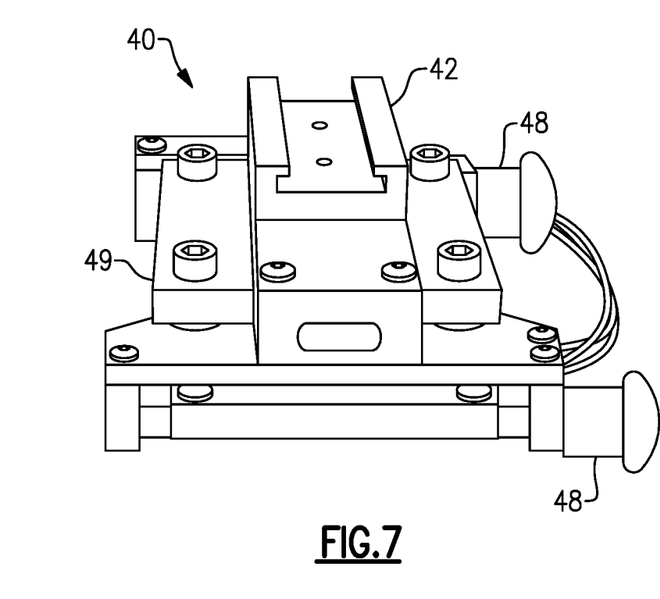
FIG. 7 is a side perspective view of the sealer unit of FIG. 6.

Some details of the sealer unit 40 can be explained as illustrated in the perspective of FIG. 6, the bottom view of FIG. 6A, and side view of FIG. 7. The unit 40 has a slide-on mounting bracket or shoe 42 with a transverse T-slot that mates with the T-bar mount 16 beneath the shelf or platform 14. Just beneath the T-slot bracket or shoe 42, an arrangement of compression springs 47 reach from a main heater frame 49, on which the bracket or shoe 42 is affixed, to the heater plate 46 to provide resilient pressure when the sealer unit contacts and bears onto the plastic film workpiece. FIG. 6A shows the PTFE ribbon or belt stretching across the contact face of the heated plate 46 from one winder spindle 48 to the other.

Figure 8:
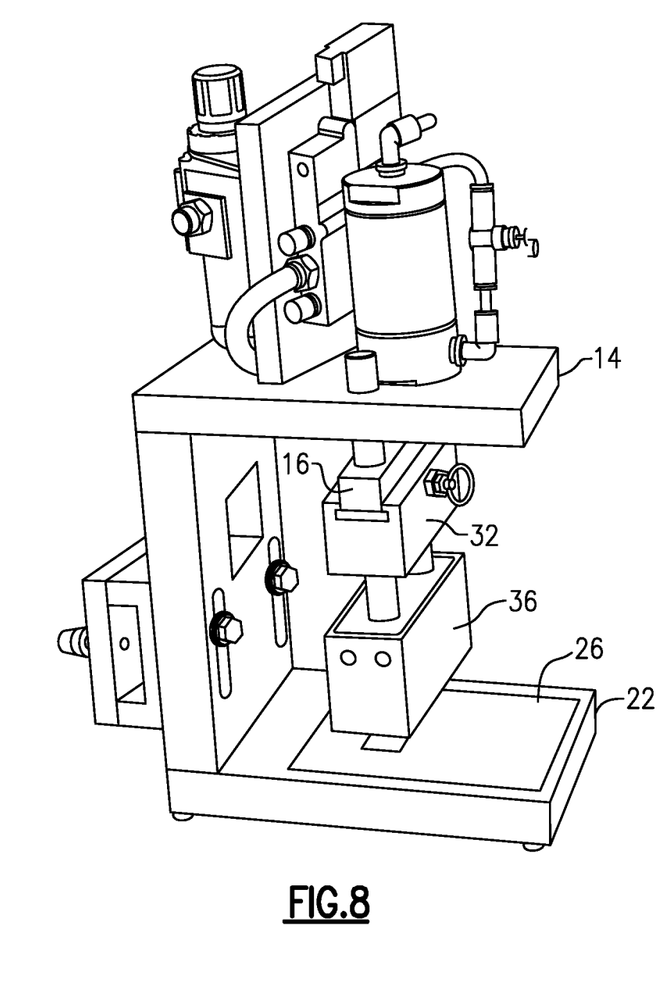
FIG. 8 is a side perspective view of a mounting frame and reciprocating film punch unit of an embodiment of the invention.

The interchangeable unit, fitted with a punch arrangement is illustrated as a side perspective in FIG. 8, showing base member 22 and shelf or platform 14 of the frame, and showing the punch assembly 30 with the shoe or mounting bracket 32 and its T-slot channel fitted onto the T-bar mount, and having the punch hole punch with hold-down cover 36 positioned in alignment with a mating aperture in the base plate 26. The vertical back plate attaches to the base member 22 and platform, and the cylinder and pneumatic controls are mounted above the platform.

Figure 9:
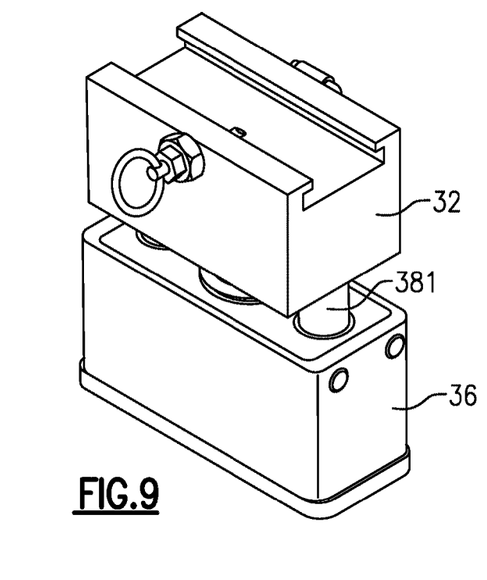
FIG. 9 is a perspective view of an interchangeable hole punch unit of an embodiment, similar to that shown in FIG. 8.
Figure 10:
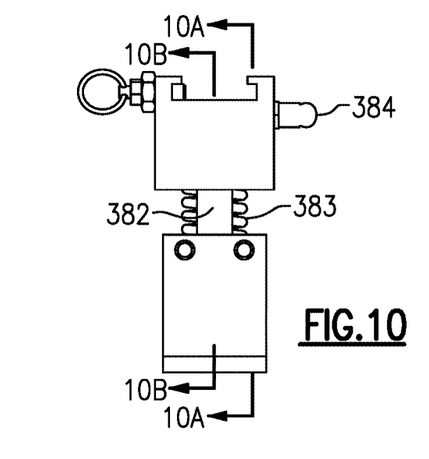
FIG. 10 is a side elevation thereof.
Figure 10A:
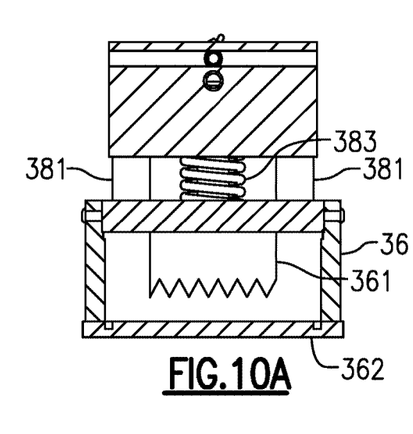
FIGS. 10A and 10B are cross sections taken at 10A-10A and 10B-10B of FIG. 10.
Figure 10B:
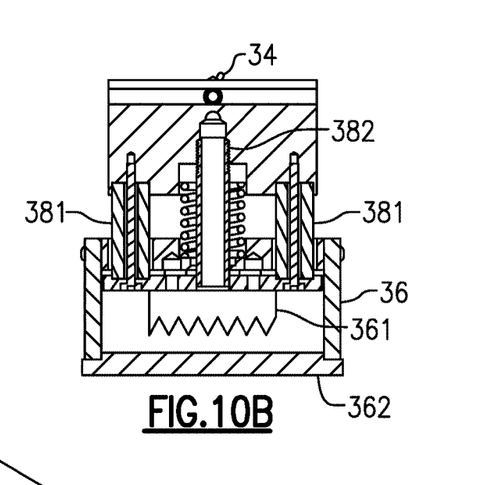

The details of the punch head assembly 30 are shown in FIGS. 9, 10, 10A and 10B, of which FIG. 9 is a perspective, FIG. 10 is a side projection, FIG. 10A is a section thereof taken at 10A-10A of FIG. 10, and FIG. 10B is a section taken at a position indicated at 10B-10B of FIG. 10. FIGS. 9 and 10 show hold-down clamp or cover 36 and T-slot shoe 32, connected by the triple-tree arrangement of which guide post 381 and spring 383 are visible, and with retaining pin 34 and air fitting or nipple 384 disposed on front and back sides, respectively, of the shoe or mounting bracket. A cutting head 361 of the punch is illustrated in the cross-sections of FIGS. 10A and 10B, and can have any shape as desired for a given manufacture. These views also show a safety cover 362 fitted into the open bottom end of the clamp or cover 36. This safety cover guards the cutting edge of the cutting head 361 during storage or transit, and also protects the fingers of persons handling this equipment before installation or after removal. This cover 362 is removed before a manufacturing run, and is replaced when the punch head is to be removed. As shown in FIG. 10B, the center post 382 is hollow, and its upper end is in pneumatic communication with the nipple 384. This permits compressed air to be applied into the cutting head 361 to blow out the punched out material from the head and from the workpiece to a receptacle (not shown) beneath the base member 22 of the equipment.

A pair of sealing arrangements can be arranged with the base members against each other or alternatively having a common platform over which an upper pair of plastic webs and a lower pair of plastic webs can pass, with the common platform serving as a partition for an upper pair of plastic film webs and a lower pair of plastic film webs, to achieve sealing of the two respective webs in one operation. In that case, the lower of the two respective frames could be inverted, with the cylinder or actuator beneath the platform or shelf, and with the T-bar mount situated above the platform or shelf, so that the two sealing heads would each be facing towards the common platform. The latter may have a non-stick coating so that the plastic workpieces do not adhere to it as a result of the sealing operation.

While this invention has been described in detail with reference to a selected preferred embodiments, it should be recognized that the invention is not limited to those embodiments. Rather, many modifications and variations will present themselves to persons skilled in the art without departing from the scope and spirit of the invention, as defined in the appended claims.

What is claimed is:

1. An arrangement for interchangeably punching an opening or slit into a sheet of a plastic film and sealing a predetermined portion of a sheet of plastic film, comprising
   a mount on which a punching head and a sealing head can be interchangeably mounted, including a frame; an actuator mounted on the frame and having a rod providing linear motion, a base plate situated opposite said actuator; and a transverse holder member positioned on said rod extending transversely and having a T shaped profile;
   at least one plastic-film punch of the type having a mounting shoe at upper portion thereof and configured with a T-profile transverse channel therein that extends transversely such that the mounting shoe slides onto and is removably retained on said T-profile holder member, the mounting shoe including a deflectable member that removably engages a detent in said holder, and
   at least one sealer arrangement interchangeable with said plastic-film punch having a controllably heated plate that is adapted for softening said plastic film when brought into contact therewith; and a mounting shoe at an upper portion thereof and configured with a T-profile transverse channel therein such that the mounting shoe slides transversely onto and is removably retained on said said holder member, the mounting shoe of the sealer arrangement including a deflectable member that removably engages said detent in said T-profile holder member.

2. The arrangement according to claim 1 wherein said mount includes a triple-tree support that includes a transverse support member attached on said frame and having a series of guide openings therein, including a center opening and left and right guide openings, with said rod of said actuator passing slidably through said center opening, and with a pair of guide posts passing slidably respectively through said left and right guide openings, and with said rod having a distal portion affixed onto said transverse holder member and said guide rods having respective distal portions affixed onto said transverse holder member on opposite sides of said rod.

3. The arrangement according to claim 2 wherein said plastic film punch includes a triple-tree punch guide arrangement having a central vertical post and left and right guide posts each affixed onto a lower portion of said transverse mounting shoe; a punch member affixed to a lower end of said central vertical post, and a hold-down cover disposed around lateral sides and ends and having a top wall disposed between the punch member and said transverse mounting shoe, with guide openings formed in said hold-down cover aligned with said left and right vertical guide posts and said central post, respectively.

4. The arrangement according to claim 3 comprising a compression spring disposed over said central post, and mounted between the top wall of said hold-down cover and the transverse mounting shoe.

5. The arrangement according to claim 1, wherein said transverse holder member includes a transverse bar and a pair of edge flanges on a distal side thereof remote from said cylinder.

6. The arrangement according to claim 1, wherein said deflectable member includes a spring-loaded pin passing into said channel with a nose thereof biased to engage said detent and a grip member adapted to permit a technician to pull the pin out to disengage the pin from said detent.

7. The arrangement according to claim 1, wherein said at least one sealer arrangement includes a triple-tree support that includes a center post and a pair of guide posts disposed parallel with and on either side of said center post, and connected with said mounting shoe.

8. The arrangement according to claim 7 wherein said sealer includes a pair of spindles respectively positioned on opposite ends of said heated plate, and a supply of a non-stick, heat-hardy flexible sheet wound about said spindles and extending between said spindles and across said heated plate, said spindles being adapted to rotate to advance said flexible sheet across said heated plate.

9. The arrangement according to claim 8 wherein said non-stick heat-resistant flexible sheet is formed at least in part of PTFE (polytetrafluoroethylene).

10. An arrangement for interchangeably punching an opening or slit into a sheet of a plastic film and sealing a predetermined portion of a sheet of plastic film, comprising
    a mount on which a punching head and a sealing head can be interchangeably mounted, including a frame; an actuator mounted on the frame and having a rod providing linear motion, a base plate situated opposite said actuator; and a transverse holder member positioned on said rod extending transversely and having a T-shaped profile, said transverse holder member taking the form of one of a male holder member having a T-shaped profile and a female channel member having a transverse T-profile channel;
    at least one plastic-film punch of the type having a mounting shoe at upper portion thereof taking the other of said male holder member and said female channel member, with the male holder member and the female channel member being configured such that the mounting shoe and said female channel member slide transversely onto and are removably retained on one another, said female channel member including a deflectable member that removably engages a detent in said male holder member, and
    at least one sealer arrangement interchangeable with said plastic-film punch having a controllably heated plate that is adapted for softening said plastic film when brought into contact therewith; and a mounting shoe at upper portion thereof and taking the form of said other of said male holder member and said female channel member such that the mounting shoe and said transverse holder member slide transversely onto and are removably retained on one another, with said female channel member including a deflectable member that removably engages a detent in said male holder member.

11. The arrangement according to claim 10 wherein said mount includes a triple-tree support that includes a transverse support member attached on said frame and having a series of guide openings therein, including a center opening and left and right guide openings, with said rod of said actuator passing slidably through said center opening, and with a pair of guide posts passing slidably respectively through said left and right guide openings, and with said rod having a distal portion affixed onto said transverse holder member and said guide rods having respective distal portions affixed onto said transverse holder member on opposite sides of said rod.

12. The arrangement according to claim 11 wherein said plastic film punch includes a triple-tree punch guide arrangement having a central vertical post and left and right guide posts each affixed onto a lower portion of said transverse mounting shoe; a punch member affixed to a lower end of said central vertical post, and a hold-down cover disposed around lateral sides and ends and having a top wall disposed between the punch member and said transverse mounting shoe, with guide openings formed in said hold-down cover aligned with said left and right vertical guide posts and said central post, respectively.

13. The arrangement according to claim 12 comprising a compression spring disposed over said central post, and mounted between the top wall of said hold-down cover and the transverse mounting shoe.

14. The arrangement according to claim 10, wherein said male holder member includes a transverse bar and a pair of edge flanges.

15. The arrangement according to claim 10, wherein said female channel member of each of said at least one plastic film punch and said at least one sealer arrangement includes a spring-loaded pin passing into said channel with a nose thereof biased to engage the detent in the associated male holder member and a grip member disposed at a proximal end hereof and adapted to permit a technician to pull the pin out to disengage the nose of the pin from said detent.

\* \* \* \* \*